National Patent Office 2,842,357
Patented July 8, 1958

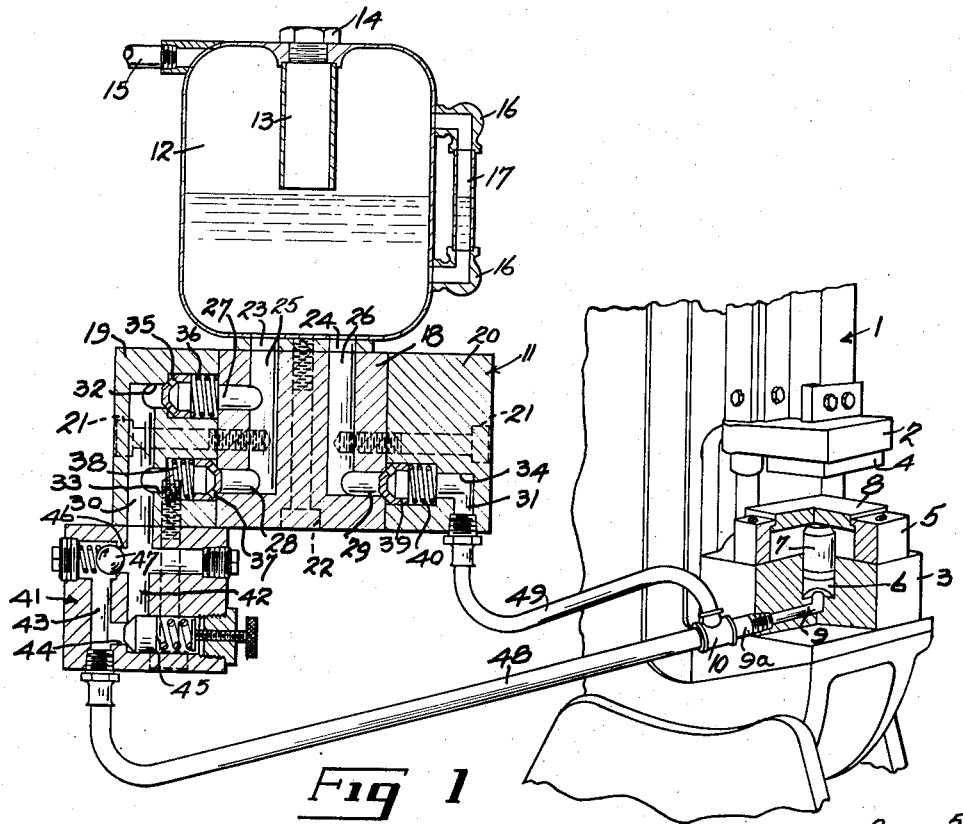
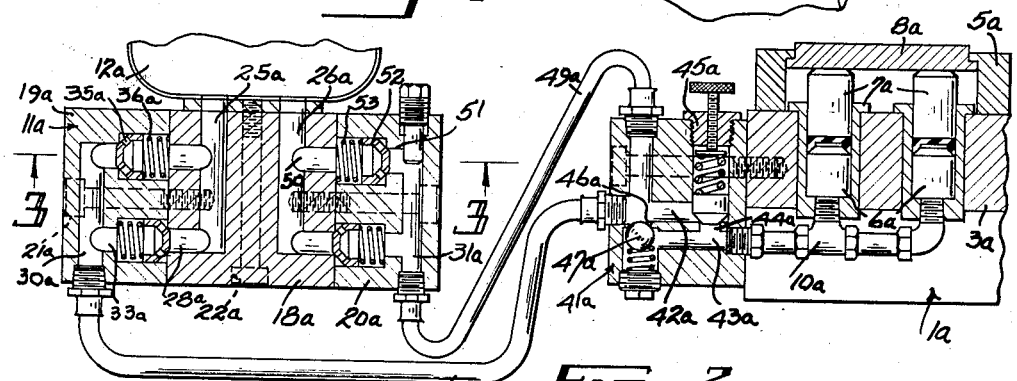
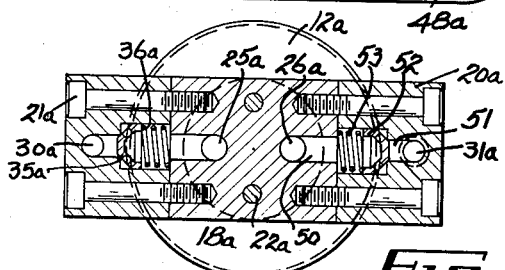

2,842,357

CIRCULATING SYSTEMS FOR HYDRAULIC LIQUID BETWEEN STORAGE TANKS AND CYLINDERS

Floyd M. Williamson, Detroit, Mich.

Application March 4, 1957, Serial No. 643,635

6 Claims. (Cl. 267—1)

This invention relates to improvements in circulating systems for hydraulic liquid between tanks and cylinders, and refers primarily to such a system for controlling the movement of pads in dies on mechanical presses. In such a system relatively low pressure, say one hundred pounds per square inch which is constantly maintained upon liquid in the tank, is exerted in the cylinder during the upstroke of the press for moving the pad outward relative to the die, and, during the downstroke of the press, high pressure, say three to five thousand pounds per square inch, is exerted through the pad upon the liquid in the cylinder to open a relief valve. As these high and low pressures are alternately exerted in rapid succession and in opposite directions very considerable fluctuations in pressure are constantly being exerted in the cylinder. If a single line is run from the tank through suitable valves and conduits to the cylinder only a small proportion of the liquid in the system performs most of the work, and in so doing surges back and forth in the cylinder and the lines connected thereto. Consequently, due to the high pressure required to open the relief valve, so much heat is generated in that surging liquid that it shortens the life of the plunger and its packing in the cylinder and impairs their efficiency. Meanwhile the greater portion of the liquid in the system remains cool in the tank and very little of it indeed mixes with the heated liquid to lower the temperature of the latter. If separate lines are utilized between the tank and cylinder, each to carry the entire flow in one direction, it is necessary to make them relatively quite large on account of the rapidity of the flow which must occur alternately through them as the press is reciprocated. This requirement for relatively large lines is further emphasized by the fact that it is a common practice to use a set of dies at different times on different presses, most of which operate at different speeds. On the other hand due to the pressures exerted and their rapid fluctuations it is very desirable to keep the lines as small as possible to reduce the possibility of leakage or breakage, for, roughly, by halving the diameter of a line its safety factor is doubled.

It is an object of the invention to provide a circulating system for hydraulic liquid between a storage tank and a cylinder wherein the latter is connected to a pressure relief valve, and a control valve is interposed between the latter and the tank, so that some liquid heated by pressure generated in the cylinder by movement of a plunger therein against the resistance of the relief valve, flows back to the tank and is replaced in the cylinder, upon the next stroke of the plunger, by cooler liquid from the tank. Thus the temperature of the liquid in the cylinder is prevented from rising to such a degree that it is liable to damage the plunger or its packing or impair its operating efficiency.

Another object of the invention is to provide such a circulating system between a storage tank and a cylinder wherein conduits of minimum size may be utilized between the tank and cylinder to minimize the tendency for the conduits to become defective due to the constantly fluctuating pressure of the liquid flowing through them.

A further object of the invention is to provide such a circulating system wherein the tank is provided with two openings to each of which a conduit connected to the cylinder is secured, and to so arrange the conduits that while liquid from the tank is adapted to flow to the cylinder through one of them, and liquid from the cylinder is adapted to flow back to the tank through the other, means are also provided for permitting a supplementary flow to pass to the cylinder through said other conduit if the flow through the first one in the time permitted is insufficient. Moreover in one embodiment herein disclosed provision is also made for a supplementary flow from the cylinder back to the tank through the first named conduit.

Having thus stated some of the objects of the invention I will now describe it more fully with the aid of the accompanying drawing, in which:

Figure 1 is a perspective view of a portion of a mechanical press, and means shown in section, on a somewhat enlarged scale, for controlling a flow of hydraulic liquid to and from a cylinder in the lower die shoe of the press beneath a pad mounted for movement in the lower die.

Figure 2 shows a slightly modified arrangement of the control means, and

Figure 3 is a section on the line 3—3 of Figure 2.

Referring first to Figure 1, 1 designates a conventional mechanical press having upper and lower die shoes 2 and 3 on which upper and lower dies 4 and 5, respectively, are secured. Provided in the lower die shoe 3 is a cylinder 6 having a plunger 7 therein, and mounted for vertical movement in the lower die is a pad 8 adapted to be moved upward by the plunger.

Formed through the lower shoe 3 is a passage 9 through which hydraulic liquid is adapted to flow into the cylinder 6. Suitably connected to the outer extremity of the passage 9 as by a nipple 9a is a T-fitting 10 the bore of which is preferably slightly larger than that of the passage.

11 denotes a control valve having, in the present instance, a storage tank 12 directly mounted thereon. Dependingly secured in the tank is a filler pipe 13 normally closed at its upper extremity by a plug 14. Pressure, of said one hundred pounds per square inch, is constantly maintained upon the hydraulic liquid in the tank by compressed air supplied through a pipe 15 one extremity of which terminates in the tank adjacent the top thereof, and the opposite extremity of the pipe is connected to a suitable compressed air source—not shown. 16 indicates conventional sight gauge fittings mounted in the tank to receive opposite extremities of a transparent gauge glass 17 to indicate the level of the liquid in the tank.

The control valve 11 includes a central block 18 having laterally opposed side blocks 19 and 20 secured thereto as by screws 21, and extending through the central block are suitable fastening means, such as screws 22, for holding the tank 12 immovable thereon. Formed through the underside of the tank are spaced openings 23 and 24 which register with parallel ports 25 and 26, respectively, which extend downward in the central block 18. Projecting laterally outward through one side of the block 18 from the port 25 are vertically spaced passages 27 and 28, and extending through the opposite side of the block from the port 26 is a passage 29. Formed vertically in the side blocks 19 and 20 from their lower extremities are vertical apertures 30 and 31, respectively. Extending horizontally through the side block 19 and connecting the aperture 30 with the passages 27 and 28 are vertically spaced openings 32 and 33, respectively, and extending through the block 20 and connecting the aperture 31 with the passage 29 is an opening 34. The openings 32, 33 and 34 are of increased diameter from their extremities adjacent the passages 27, 28 and 29, respectively, for a portion of their length. Mounted in the enlarged portion of the opening 32 is a check valve 35, and bearing at one extremity against the latter and at its opposite extremity against the outer face of the central block around the passage 27 is a helical spring 36 which urges the said valve against a seat formed in the said opening 32 intermediately of its length where its reduction in size occurs. In the enlarged portion of the opening 33 a check valve 37 is provided which is adapted to seat against the outer face of the passage 28 against which it is normally urged by a spring 38 mounted in the enlarged portion of the said opening 33; and in the enlarged portion of the opening 34 is a check valve 39 which is similarly urged against the outer extremity of the passage 29 by a spring 40. Moreover the spring 38 is slightly stronger than the spring 40.

Thus the port 26, the passage 29, the opening 34 having the check valve 39 therein and the aperture 31 together form a passageway through the control valve for a flow of liquid from the tank 12; and the aperture 30, the opening 32 having the check valve 35 therein, the passage 27 and the port 25 together form a second passageway through the control valve for passage of liquid to the tank. A by-pass around the check valve 35 is formed in the last named passageway by the passage 28 and the opening 33 in which the check valve 37 is provided, but due to the fact that the spring 38 adapted to close the valve 37 is stronger than the spring 40 urging the valve 39 to its closed position the primary flow from the tank passes through the aperture 31 while a supplementary flow only is adapted to pass through the aperture 30.

Mounted in this case upon the underside of the control valve 11 is a relief valve body 41 having one passage 42 therein in registry with the aperture 30, and a second passage 43 extending from the underside of the body parallel with the passage 42. Extending transversely through the body 41 from the lower extremity of the passage 42 is a port 44 connecting it with the passage 43, and mounted in the body to close the port at its extremity adjacent the passage 42 is an adjustable spring loaded relief valve 45 so that a flow may occur from the passage 43 to the passage 42 when liquid pressure in the port is sufficient to open the relief valve. Then liquid entering the passage 42 flows through the aperture 30 into the tank 12. Formed also in the body 41 is a bypass 46 having a check valve 47 therein to permit liquid from the tank to pass therethrough to the passage 43 when the valve 37 in the by-pass 28, 33 in the control valve 11 is open.

The passage 43 and the aperture 31 are connected by suitable connections 48 and 49, respectively, to the fitting 10. Thus a conduit from the tank to the cylinder 6 is formed through the passageway in the control valve including the port 26 and the aperture 31, the connection 49 and fittings 10 and 9a; and a second conduit from the cylinder to the tank is formed through the fittings 9a and 10, the connection 48, the relief valve 45 and the passageway through the control valve including the aperture 30 and the port 25. However the flow through this second conduit may be reversed by the opening of the check valves in the by-passes 28, 33, and the port 46.

Upon the upstroke of the press, when no downward pressure is being exerted upon the pad 8, liquid pressure, say one hundred pounds per square inch, in the tank is exerted through the port 26, aperture 31, and connection 49 against the plunger 7 in the cylinder 6 and moves the pad 8 to its raised position. However since this liquid is flowing under relatively low tank pressure it is travelling relatively slowly. If its speed is not sufficient to fill the cylinder during the upstroke of the press then additional liquid from the tank opens the check valve 37 in the by-pass 28, 33 against the tension of the spring 38 which is somewhat greater than the tension of the spring 40 tending to close the valve 39, and a supplementary flow to the cylinder occurs through the by-pass port 46 and the connection 48.

Upon the downstroke of the press the pad 8 remains stationary, in its raised position, until the pressure exerted against it by the upper die 4 reaches the amount for which the relief valve 45 is set, whereupon the relief valve opens and liquid heated by pressure in the cylinder and between the latter and the relief valve passes to the tank. During that time the speed of flow of the liquid is very rapid since its pressure is quite high, and consequently, in the case of relatively small presses at least and ones wherein only one small cylinder is employed, a sufficiently fast flow is obtained through the relief valve and the remainder of the conduit of which it forms a part.

In the modification shown in Figure 2 the relief valve body 41a is mounted directly on a press 1a, and is spaced from the control valve 11a. In this case a plurality of cylinders 6a are provided in the lower die shoe 3a and have plungers 7a therein which are adapted to control the movement of a pad 8a in the lower die 5a. A suitable connection 10a connects the cylinders with a passage 43a in the body 41a of the relief valve. In the latter another passage 42a is formed, and these passages are connected by a port 44a the extremity of which opening into the passage 42a is normally closed by a relief valve 45a so that when pressure exerted upon liquid in the cylinders exceeds that for which the relief valve is set a flow to the tank occurs primarily through the connection 48a and past the check valve 35a in the control valve back to the tank.

However in this case the relief valve 45a is connected to the connection 49a also so that when it is open a flow occurs through the said connection into the aperture 31a in the control valve 11a. This control valve 11a is the same as the control valve 11 above described except that a by-pass 50, 51 through the central block 18a and the side block 20a, respectively, connects the port 26a and the aperture 31a. The opening 51 is of increased diameter from the central block 18a for a portion of its length to receive a check valve 52. This check valve is urged against a seat formed in the said opening intermediately of its length where its reduction in size occurs by a spring 53 the opposite extremity of which rests against the central block around its opening 50. The spring 53 for closing the valve 52 is somewhat stronger than the spring 36a by which the valve 35a is adapted to be closed so that while the connection 48a, the aperture 30a in the side block 19a and its opening having the check valve 35a therein form part of the conduit through which the major portion at least of the flow to the tank passes, a supplementary flow to the tank may flow from the relief valve through the connection 49a and the by-pass 50, 51.

This additional by-pass is desirable in larger presses where the volume of liquid discharged from the cylinder is relatively great, particularly since in this arrangement the relief valve is mounted on the press itself and spaced from the control valve and the tank. For then obviously liquid has a much greater distance to travel to the tank under low pressure, and therefore at a relatively slow speed, after leaving the relief valve.

Again in this instance all liquid flowing from the tank to the cylinder, either through the primary conduit including the port 26a and the connection 48a, or through the other conduit including the port 25a and the connection 48a and the bypass 28a, 33a, passes through the by-pass 46a connecting the passages 42a and 43a and having the check valve 47a therein. Screws 21a secure the side blocks 19a and 20a to the central block 18a of the control valve, and the tank 12a is fastened upon the latter as by screws 22a.

It will be clear that in both embodiments while all the heated liquid in the cylinder and between the relief valve and the latter is not replaced during each upstroke of the press a sufficient amount of cool liquid from the tank does pass to the cylinder to prevent undue heating therein. Again both embodiments contemplate the use of small and therefore strong conduits and connections which are unlikely to become leaky or defective.

Though the pad has been shown and described as being in a lower die the arrangement may of course be as effectively utilized for moving a pad in an upper die; and again plungers in separate cylinders may be arranged in a single die shoe to control movement of separate pads in a die, provided of course the pads are to move in unison.

While in the foregoing two preferred embodiments of the invention have been described and shown, it is understood that further alterations and modifications may be made thereto provided they fall within the scope of the appended claims.

What I claim is:

1. A circulating system for hydraulic liquid comprising a storage tank having liquid therein under relatively low pressure, said tank having openings therein, a cylinder having a plunger therein, a conduit connected to each opening, the opposite extremities of the conduits being connected to one and the same extremity of the cylinder, a spring closed check valve in one conduit past which liquid is adapted to flow from the tank to the cylinder to move the plunger therein in one direction, a check valve in the other conduit past which liquid flowing to the tank is adapted to travel, a relief valve interposed in the other conduit between the check valve therein and the cylinder, said relief valve being adapted to be opened by liquid expelled under relatively high pressure from the cylinder by movement of the plunger in the other direction, said other conduit having a by-pass therein extending around the check valve therein and a second by-pass therein extending around the relief valve through both of which liquid flowing through said other conduit to the cylinder is adapted to pass, a spring closed check valve in the first named by-pass having a stronger spring therein than in the first named spring closed check valve whereby liquid is adapted to flow primarily to the cylinder from the tank through the first named conduit and a supplementary flow is adapted to pass from the tank to the cylinder through said other conduit and its by-passes, and a check valve in said second by-pass to prevent the passage of liquid therethrough towards the tank.

2. A circulating system for hydraulic liquid comprising a storage tank having liquid therein under relatively low pressure, said tank having openings therein, a cylinder having a plunger therein, conduits one extremity of each of which is connected to one of the tank openings, means connecting the opposite extremities of the conduits to one and the same extremity of the cylinder, a spring-closed check valve in one conduit past which liquid is adapted to flow to the cylinder to move the plunger therein in one direction, a spring-closed check valve in the other conduit past which liquid is adapted to flow to the tank, a pressure relief valve interposed in both conduits between their check valves and the cylinder, said relief valve being adapted to be opened by liquid expelled under relatively high pressure from the cylinder by movement of the plunger in the opposite direction, said expelled liquid being adapted to flow toward the tank, a by-pass connected to both conduits and extending around the relief valve through which liquid is adapted to flow toward the cylinder, a check valve in said by-pass adapted to be opened by liquid under pressure flowing therethrough towards the cylinder, a by-pass connected to each conduit and extending around the spring-closed check valve therein, a spring-closed check valve in the by-pass extending around the check valve in said other conduit past which liquid is adapted to flow to the tank, a spring-closed check valve in the by-pass extending around the check valve in said one conduit past which liquid is adapted to flow to the cylinder, and the springs urging the two last named check valves in the by-passes to their closed positions being stronger than the springs urging the check valves in the conduits to their closed positions, whereby liquid is adapted to flow to the cylinder mainly through said one conduit and to the tank mainly through said other conduit.

3. A circulating system for hydraulic liquid comprising a storage tank having liquid therein under relatively low pressure, said tank having openings therein, a cylinder having a plunger therein, a control valve having separate passageways therein each connected at one extremity to one of said openings, a spring-closed check valve in one passageway through which liquid is adapted to flow from the tank, means connecting the other extremity of the passageway to one extremity of the cylinder whereby the plunger therein is adapted to be moved in one direction by liquid from the tank, a spring-closed check valve in the other passageway through which liquid is adapted to flow into the tank, a pressure relief valve connected to the other extremity of said other passageway, means connecting the relief valve to the same extremity of the cylinder as the aforesaid means connected thereto through which liquid is adapted to flow to the tank upon movement of the plunger in the opposite direction, a by-pass connected to said other passageway and to the means connecting the relief valve to the cylinder extending around the relief valve, a check valve in said by-pass past which liquid is adapted to flow to the cylinder, a by-pass in said other passageway extending around the check valve therein, a spring-closed check valve in said last named by-pass past which liquid is adapted to flow from the tank, and the spring actuating the check valve in the last named by-pass being stronger than the spring actuating the check valve in the first named passageway, whereby liquid is adapted to flow from the tank to the cylinder primarily at least through the first named passageway and to the tank through said other passageway so that some of the liquid heated by pressure in the cylinder and expelled therefrom is replaced by the liquid from the tank upon each reciprocation of the plunger.

4. The combination in claim 3, wherein the connecting means from the first named passageway to the tank includes the relief valve and the by-pass around the latter, a by-pass in the first named passageway extending around the check valve therein, a spring closed check valve in the last named by-pass past which liquid flowing to the tank is adapted to travel, and the spring actuating the check valve in the last named by-pass being stronger than the spring actuating the check valve in said other passageway, whereby liquid flowing to the tank is adapted to travel primarily at least through said other passageway.

5. In a hydraulic system for controlling movement of a pad in a die, the combination with a die shoe having a cylinder mounted therein and a die thereon, a pad movable in the die, a plunger in the cylinder connected to the pad whereby movement of the plunger in one direction is adapted to move the pad to its extended position and inward pressure exerted on the pad is adapted to move the plunger in the opposite direction, of a tank having liquid under relatively low pressure therein, conduits extending from the tank to one and the same extremity of the cylinder, a relief valve in one of the conduits, a check valve in that conduit between the relief valve and the tank past which liquid is adapted to flow to said tank, a spring-closed check valve in the other conduit past which liquid is adapted to flow to the cylinder, a by-pass in the first named conduit extending around the check valve therein, a spring-closed check valve in the by-pass the spring in which is stronger than the spring in the first named spring-closed check valve whereby liquid from the tank to the cylinder is adapted to travel primarily at least through said other conduit, another by-pass in the first named conduit extending around the relief valve for the passage of liquid toward the cylinder, whereby part of the liquid heated by pressure in the cylinder and expelled therefrom is replaced by liquid from the tank on each reciprocation of the plunger, and a check valve in the last named by-pass to prevent a flow of liquid therethrough towards the tank.

6. The combination in claim 5, wherein the relief valve and the by-pass around it also form part of the other conduit intermediately of its length, a by-pass in the other conduit extending around the check valve therein adjacent the tank, a spring-closed check valve in the last named by-pass past which liquid is adapted to flow to the tank, the check valve in the first named conduit being spring closed by a weaker spring than that in the last named by-pass whereby liquid flowing to the tank passes primarily at least through the first named conduit.

References Cited in the file of this patent
UNITED STATES PATENTS

| | | |
|---|---|---|
| 1,777,130 | Rode | Sept. 30, 1930 |
| 2,333,529 | Ernst | Nov. 2, 1943 |
| 2,796,253 | Schulze et al. | June 18, 1957 |